United States Patent [19]

Tam

[11] Patent Number: 5,594,766

[45] Date of Patent: Jan. 14, 1997

[54] METHOD AND APPARATUS FOR IMPROVING EFFICIENCY IN COMPUTING RADON DERIVATIVES FOR CT IMAGING

[75] Inventor: Kwok C. Tam, Schenectady, N.Y.

[73] Assignee: General Electric Company, Schenectady, N.Y.

[21] Appl. No.: 414,815

[22] Filed: Mar. 31, 1995

[51] Int. Cl.$^6$ ........................................................ A61B 6/03
[52] U.S. Cl. ........................... 378/4; 378/901; 364/413.16
[58] Field of Search .................. 378/901, 4; 364/413.14, 364/413.16, 413.19

[56] References Cited

U.S. PATENT DOCUMENTS

| | | | |
|---|---|---|---|
| 5,253,171 | 10/1993 | Hsiao et al. | 364/413.19 |
| 5,257,183 | 10/1993 | Tam | 364/413.19 |
| 5,333,164 | 7/1994 | Tam | 378/8 |
| 5,446,776 | 8/1995 | Tam | 378/4 |

*Primary Examiner*—David P. Porta
*Assistant Examiner*—David Vernon Bruce
*Attorney, Agent, or Firm*—Paul R. Webb, II

[57] ABSTRACT

In an arrangement for computed tomography imaging, line integral data is converted into a set of Radon data, for use in constructing an image of an object, by computing the derivatives for respective data points in the Radon data set. To improve efficiency in derivative computation, the Radon space is partitioned by a set of concentric spherical shells, so that each of the Radon data points lies on one of the shells. An equal number of spherical shells corresponds to each processor in an array of processors, and each processor is operated to compute respective Radon derivatives only for Radon data points lying on its corresponding shells.

10 Claims, 6 Drawing Sheets fig. 1 fig. 2 fig. 3 fig. 4 fig. 5 fig. 6 fig. 7

METHOD AND APPARATUS FOR IMPROVING EFFICIENCY IN COMPUTING RADON DERIVATIVES FOR CT IMAGING

BACKGROUND OF THE INVENTION

The invention disclosed and claimed herein generally pertains to a method and apparatus for computed tomography (CT) cone-beam imaging by means of the Radon transform, wherein x-ray projection data is converted to Radon planar integral data by computing respective Radon derivatives from the projection data.

One of the most important techniques currently used in constructing a CT image of an object is based on the Radon transform. This technique is of particular importance in three-dimensional (3D) CT imaging. According to such technique, a cone-beam x-ray source irradiates the object while traversing a scan path to project an image of the object, in the form of cone-beam x-ray data, onto a detector plane. A two-step process is then performed, wherein the cone-beam data is converted into a set of Radon data, or planar integrals defined in Radon space, and an inverse Radon transform is performed using the planar integrals to construct the image. It is known that this process is most usefully carried out by computing the radial derivative (Radon derivative) for each planar integral in the set, from which the values of respective planar integrals can be readily determined.

Commonly assigned U.S. Pat. No. 5,257,183, issued Oct. 26, 1993 to Kwok C. Tam, the inventor named herein, discloses a very effective technique for computing the Radon derivatives for use in the above process. While this technique works quite well, a great deal of computational effort is required. In the past, this has been achieved by partitioning the Radon space by means of a set of coaxial planes, such as the set of vertical or azimuthal planes shown in FIG. 4 of the above-referenced U.S. Pat. No. 5,257,183. Each of such planes is provided with a coordinate system comprising a set of grid points, organized as a circular polar grid centered at an origin common to all of the planes. The coaxial planes partition the Radon space so that each data point in a Radon data set lies in one or another of the planes, at a grid point thereof. To determine respective derivatives, a number of adjacent azimuthal planes are typically assigned to each processor in an array of processors. Each processor computes the Radon derivatives for the Radon data points lying in its assigned planes. Thus, the processors can be operated in parallel, that is, simultaneously and independently from one another, to reduce time and complexity in determining the derivatives.

Notwithstanding the benefits of the above arrangement, it has been found that for a given view angle, the number of Radon data points lying in respective azimuthal partitioning planes for which derivatives must be computed, can vary extensively from plane to plane. Moreover, as described hereinafter in greater detail, the number of required derivative computations may be very different for different groups of adjacent planes. Accordingly, the processors tend to have very different workloads from one another, if computational tasks are assigned on the prior art basis described above.

It would be highly desirable to assign each processor approximately the same number of derivative computations to perform, for a given view angle. Workloads of the respective processors would then be fairly even, and the processors could be operated with significantly improved efficiency.

SUMMARY OF THE INVENTION

The invention provides a method for computing the Radon derivative for each data point in a set of Radon data points in Radon space from a set of line integral data. The method includes the step of partitioning the Radon space by a set of concentric spherical shells centered at the origin of the Radon space, so that each of the Radon data points lies on one or another of the shells. All the Radon data points lying on a given one of the spherical shells are assigned to the same processor in an array of processors. The given processor is operated to compute Radon derivatives from data in the line integral data set for all Radon data points assigned to the given processor.

In a preferred embodiment, a number of spherical shells, and the Radon data points respectively lying thereon, are assigned to each processor in the processor array, the number of assigned shells being the same for each processor. As will be shown in greater detail hereinafter, this will result in a fairly even distribution amongst the processors of the Radon data points, and thereby of the work effort required in computing the corresponding Radon derivatives for a given view angle.

It is to be understood that the term "partitioning", as used herein, refers to the procedure of defining a set of planes or spherical shells such that each data point in Radon space lies on one or another of the planes or shells, at a location which is known with respect thereto.

An object of the invention is to significantly improve efficiency in operating an array of processors to compute a set of Radon derivatives, for use in CT image reconstruction.

Another object is to provide a system of such type wherein the associated Radon space is partitioned by a set of concentric spheres, as the basis for assigning computational tasks to respective processors.

These and other objects of the invention will become more readily apparent from the ensuing specification, taken together with the accompanying drawings.

DETAILED DESCRIPTION OF THE PREFERRED EMBODIMENT

Figure 1:
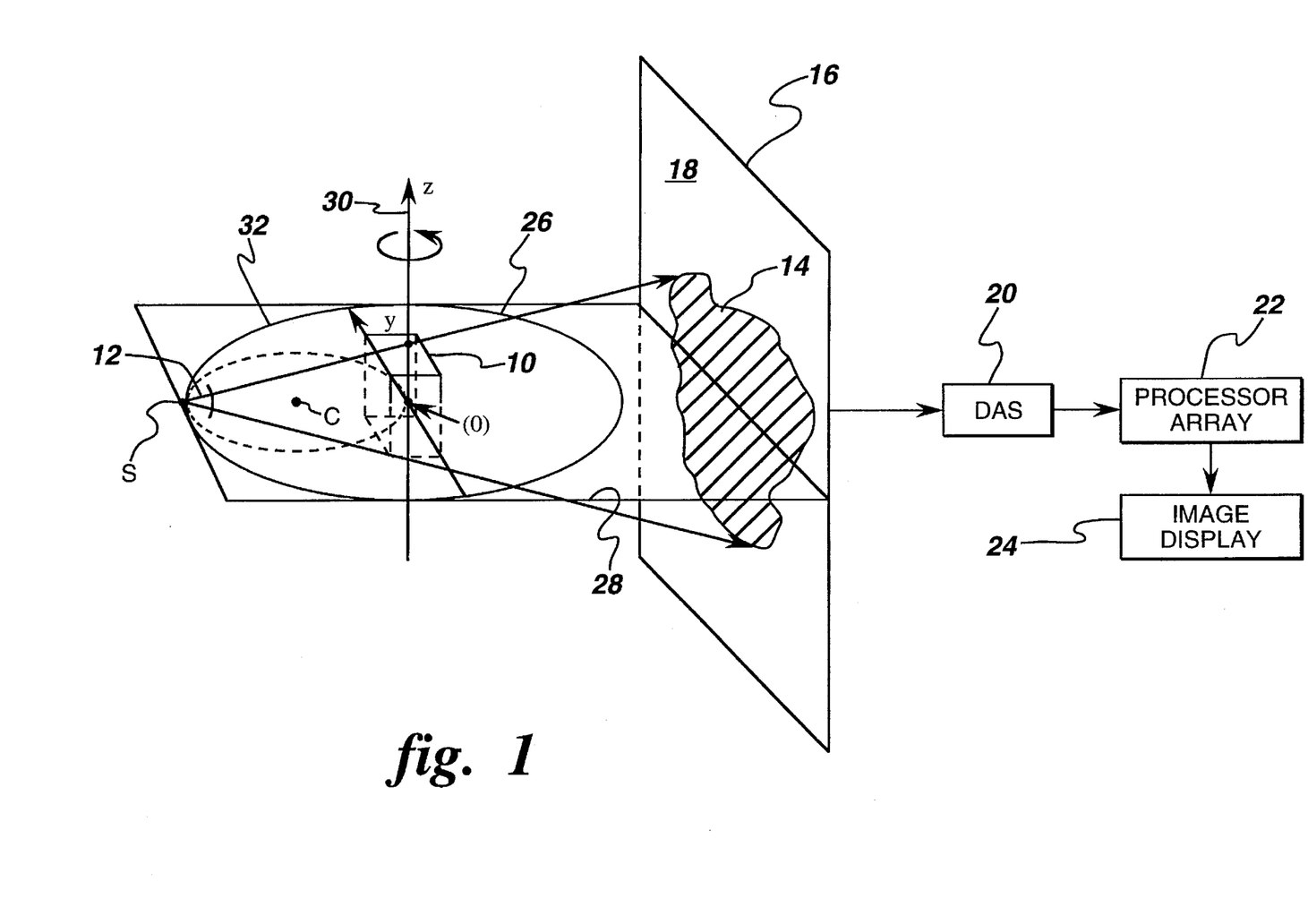
FIG. 1 is a schematic drawing illustrating the basic components of a cone-beam CT imaging system.

Referring to FIG. 1, there are shown the principal components of a cone-beam CT imaging system for reconstructing and displaying an image of an object 10. A cone-beam x-ray source 12 is positioned to irradiate object 10, to project data representing an image 14 thereof onto an associated detector array 16, having a planar detector surface 18. As is known in the art, detector array 16 comprises a matrix array of discrete detectors (not shown). Projected data is in the form of x-ray photons that penetrate the object and are sensed by the respective x-ray detectors of array 16. Array 16 is coupled to a Data Acquisition System (DAS) 20, which processes respective photon counts, in a manner well known in the art, to provide cone-beam projection data in the form of a set of line integrals representing the image 14 projected onto detector plane 18.

Referring further to FIG. 1, there is shown DAS 20 coupled to a processor array 22, which receives the cone-beam projection data from DAS 20 and operates as described herein to compute a set of Radon derivatives. The processor array 22 is further structured according to conventional practices to compute a set of planar integral values from the Radon derivatives, and to perform an inverse Radon transform to reconstruct an image of the object, employing such set of planar integral values as input data therefor. The reconstructed image is coupled from processor 22 for display by means of image display device 24.

FIG. 1 shows cone-beam source 12 moveable with respect to object 10 around a trajectory or scan-path 26, such as a circular scan path lying in a mid-plane 28. In a typical arrangement, detector array 16 is constrained to move with source 12, so that object 10 remains positioned therebetween. Cone-beam projection data is acquired by detector array 16 for successive positions of source 12, i.e., view angles, as source 12 traverses its trajectory 26.

Mid-plane 28 generally bisects object 10. A Z-axis 30 passes through the object, in orthogonal relationship with mid-plane 28, and intersects the mid-plane at a point 0. The point 0 is usefully selected to be the origin for a coordinate system for Radon space, containing respective data points in a set of Radon data. Each of the planar integral values, referred to above, is taken at one of the Radon data points, and is non-zero only for Radon data points lying in proximity to object 10.

FIG. 1 further shows the Radon shell 32 when the source 12 is located at the position S in its scan trajectory 26. As is well known to those of skill in the art, the Radon shell is a spherical shell having a diameter equal to the distance between the origin 0 and the source positions. The center of the Radon shell 32 is located at a point C, located midway between source S and the origin 0. As is further well known in the art, a Radon derivative will be non-zero only for a non-zero Radon data point intersected by the Radon shell.

Figure 2:
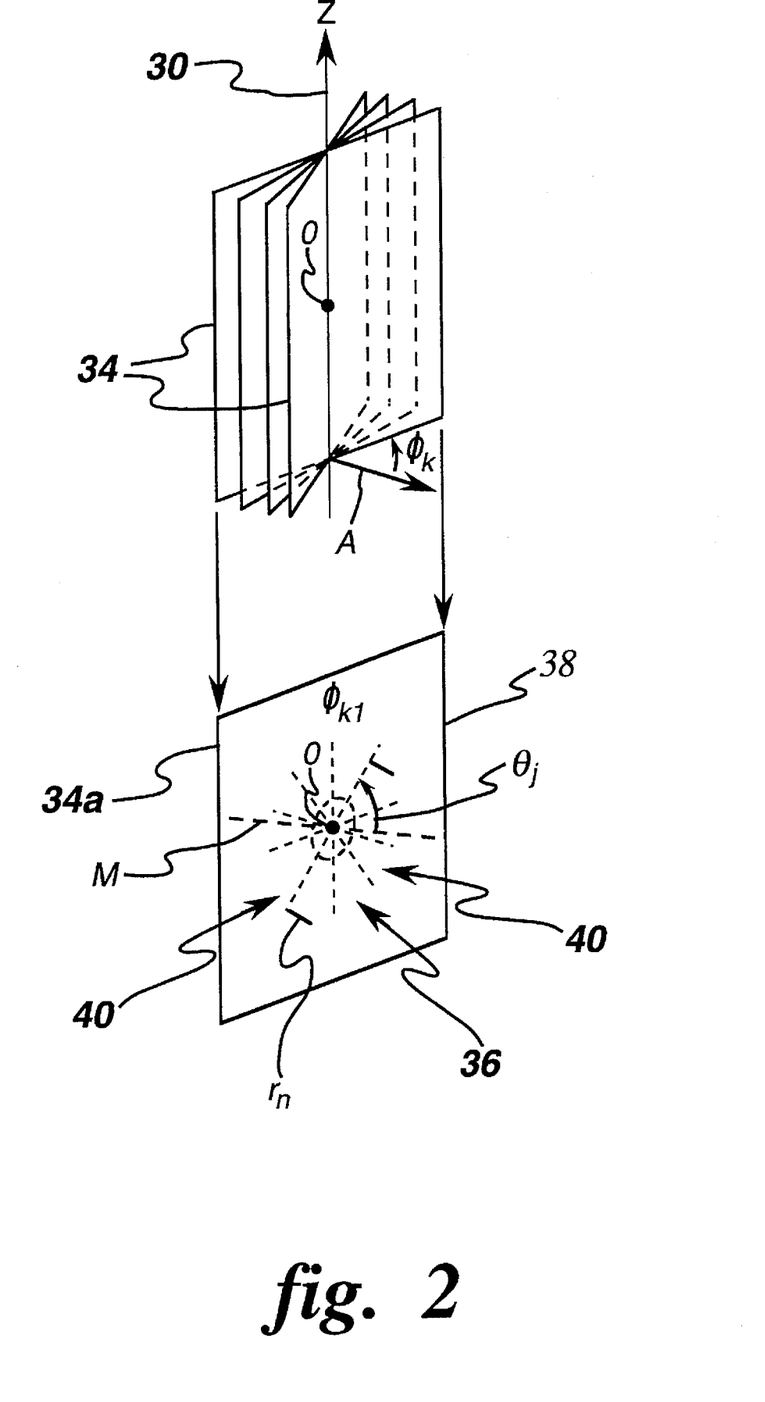
FIG. 2 depicts a set of coaxial planes for partitioning Radon space in a conventional manner.

Referring to FIG. 2, there is shown a set of vertical or azimuthal planes 34, which are co-axial about Z-axis 30 and represent all the planes which may be positioned or rotated about the Z-axis to encompass the Radon space thereabound. Each plane 34 lies at an angle $\phi K$ with respect to an axis A, orthogonal to the Z-axis, and is identified thereby. Referring further to FIG. 2, there is shown a plane 34a, comprising the azimuthal plane 34 at an angle $\phi K1$. Plane 34a is provided with a circular polar grid 36 comprising a set of grid points 38, each located at a distance $r_i$ from the origin O, and lying along a grid line 40 comprising n discrete grid points 38. Each grid line 40 thus has a maximum length $r_n$ and is oriented at an angle $\theta j$ from a reference axis M, defined by the intersection of mid-plane 28 and the azimuthal plane 34a. Each non-zero Radon data point lies on one of the grid points 38, i.e., within the circle of radius $r_n$, and is thereby uniquely located by the $r_i$ and $\theta_j$ coordinates of such grid point, together with the azimuthal angle of plane 34a.

It will be readily apparent that each of the azimuthal planes 34 positioned about the Z-axis 30 respectively intersects the Radon shell 32. Since the Radon shell is spherical, its intersection with a plane 34 defines a circle.

Figure 3:
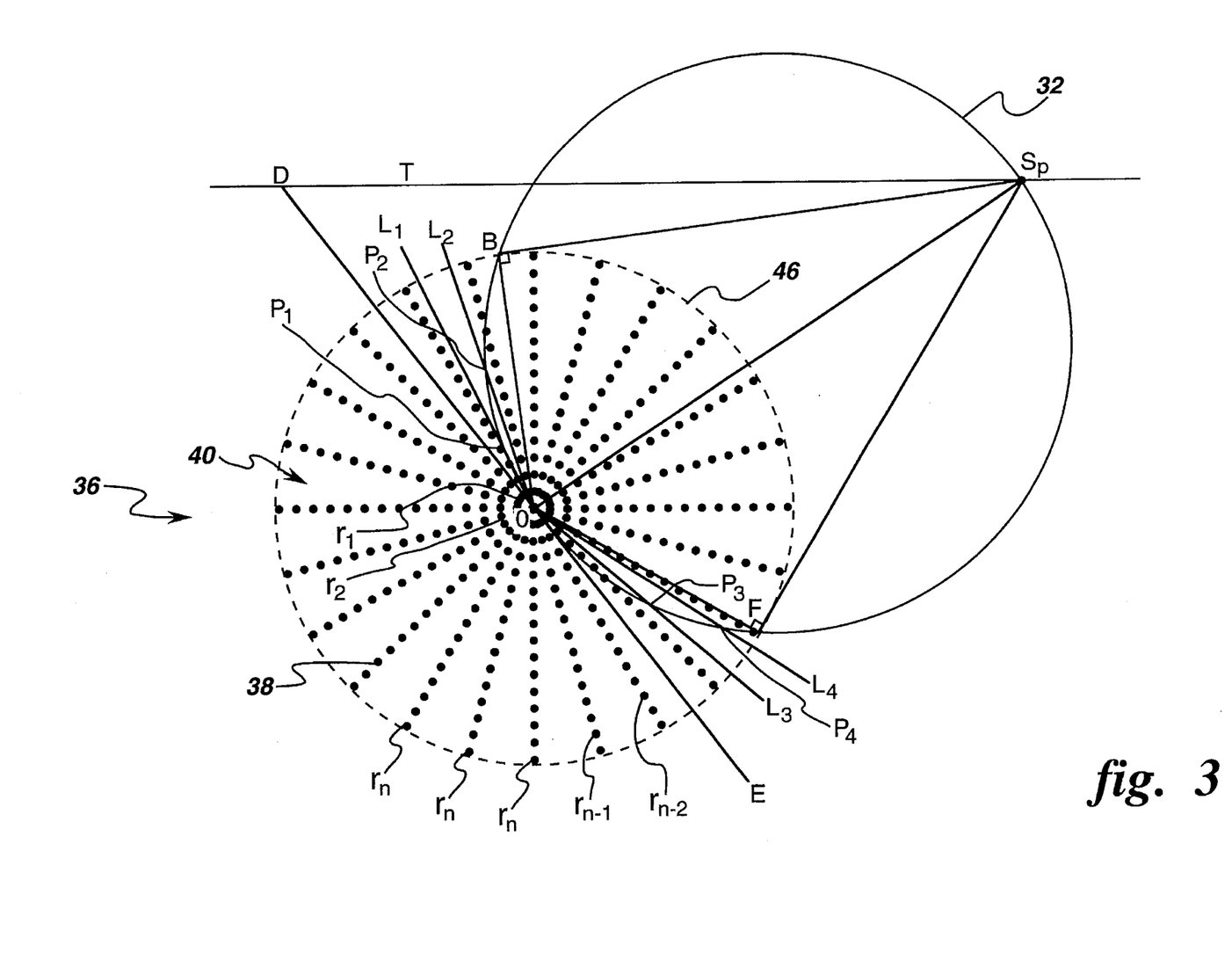
FIG. 3 depicts one of the planes from FIG. 2, together with its polar grid, and further shows the section of the Radon shell which lies in the plane.

Referring to FIG. 3, there is shown azimuthal plane $\phi K1$ intersecting Radon shell 32, for a given view angle, defined by the position S of source 12. FIG. 3 further shows a line T, comprising the projection of the source scan path 26 on such plane, together with $S_p$, the projection of the source position S on the plane. The location of $S_p$ along the line T is determined by the relative orientation between the azimuthal plane $\phi K1$ and the source position. Thus, for a given view angle the position of $S_p$ varies along the length of the line T, for azimuthal planes of varying $\theta_k$. The plane shown in FIG. 3 has an angle $\theta_k$ such that the position $S_p$ lies toward an end of the line T.

Referring further to FIG. 3, there is shown the circle defined by Radon shell 32 intersecting the circle 46, defined by the grid points 38 of radius $r_n$, at points B and F. A line DOE is drawn tangent to the Radon shell 32, in perpendicular relationship with the line $S_pO$.

As stated above, all non-zero Radon data points are located within the circle 46 of radius $r_n$. Moreover, Radon derivatives will be non-zero only at positions lying along the Radon shell. Thus, for the plane shown in FIG. 3, the only grid points at which Radon derivatives need to be computed are the points defined by the intersection of Radon shell 32 and the grid lines 40 respectively lying within the angles BOD and EOF. There are, of course, many more grid lines lying within each of these angles (hereinafter referred to as grid line-intersection angles) than are shown in FIG. 3. For illustrative purposes, additional grid lines $L_1$ and $L_2$ are shown within angle BOD, and grid lines $L_3$ and $L_4$ are shown within angle EOF, respectively intersecting the circle 32 at points $P_1$–$P_4$.

Figure 4:
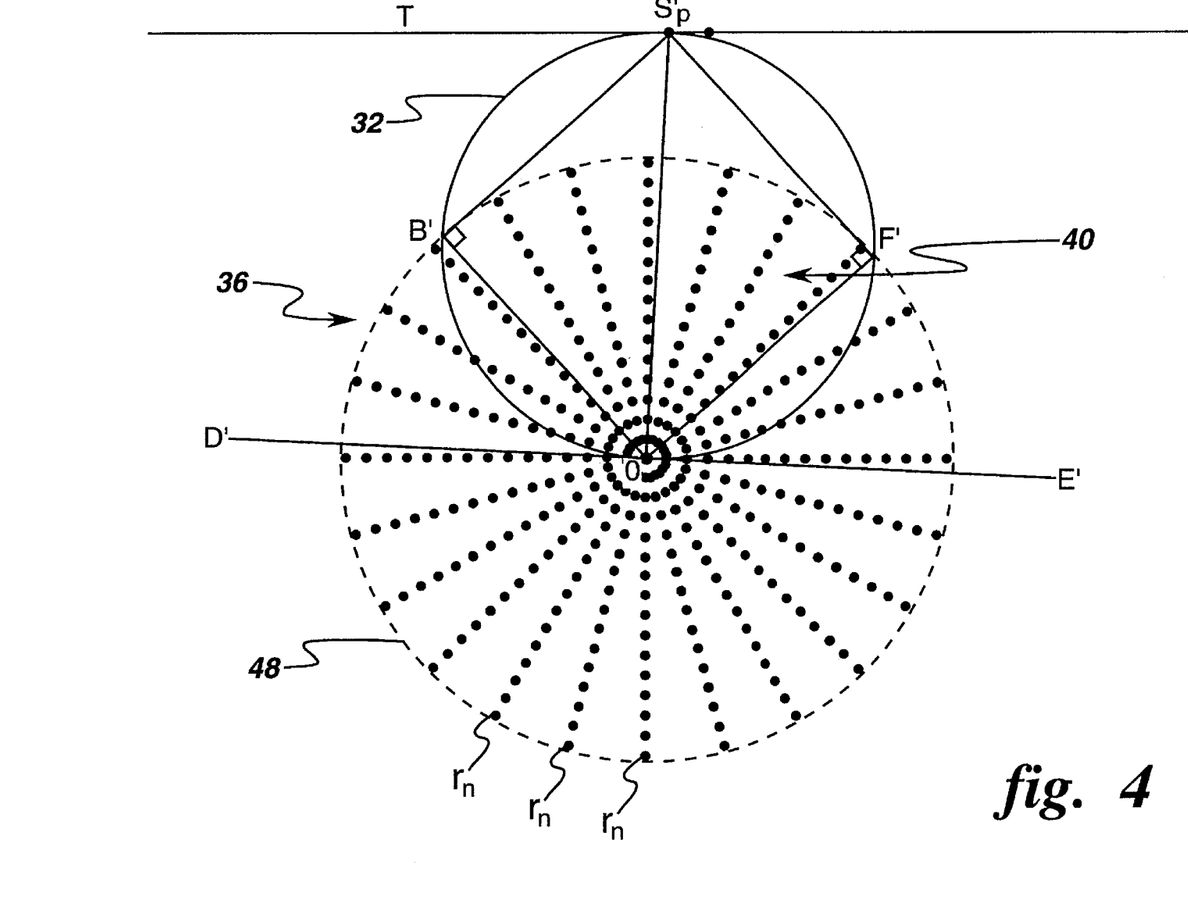
FIG. 4 depicts a plane from FIG. 2 different from the plane shown in FIG. 3.

FIG. 4 shows the Radon shell 32 intersecting an azimuthal plane having an angle $\phi_{K2}$ such that the projection of the source position S on the plane of FIG. 4, lies toward the center of the line T, at a position $S_p'$. A line D'OE' is drawn tangent to the Radon shell 32, in perpendicular relationship with the line $S_p'O$. A circle 48 defined by the points 38 of radius $r_n$ for the polar grid 36 of azimuthal plane $O_{K2}$ intersects Radon shell 32 at points B' and F'. It will be seen that the angles B'OD' and E'OF', containing grid lines 40 intersected by the Radon shell, are substantially greater than the corresponding grid line intersection angles BOD and EOF, respectively, of the plane $\phi_{K1}$ shown in FIG. 3. Thus, it is seen that many more grid lines are intersected by the Radon shell for azimuthal planes oriented such that the projection of the source position S is close to the center of line T. The effort required to compute the Radon derivatives lying in such planes is correspondingly greater.

Figure 5:
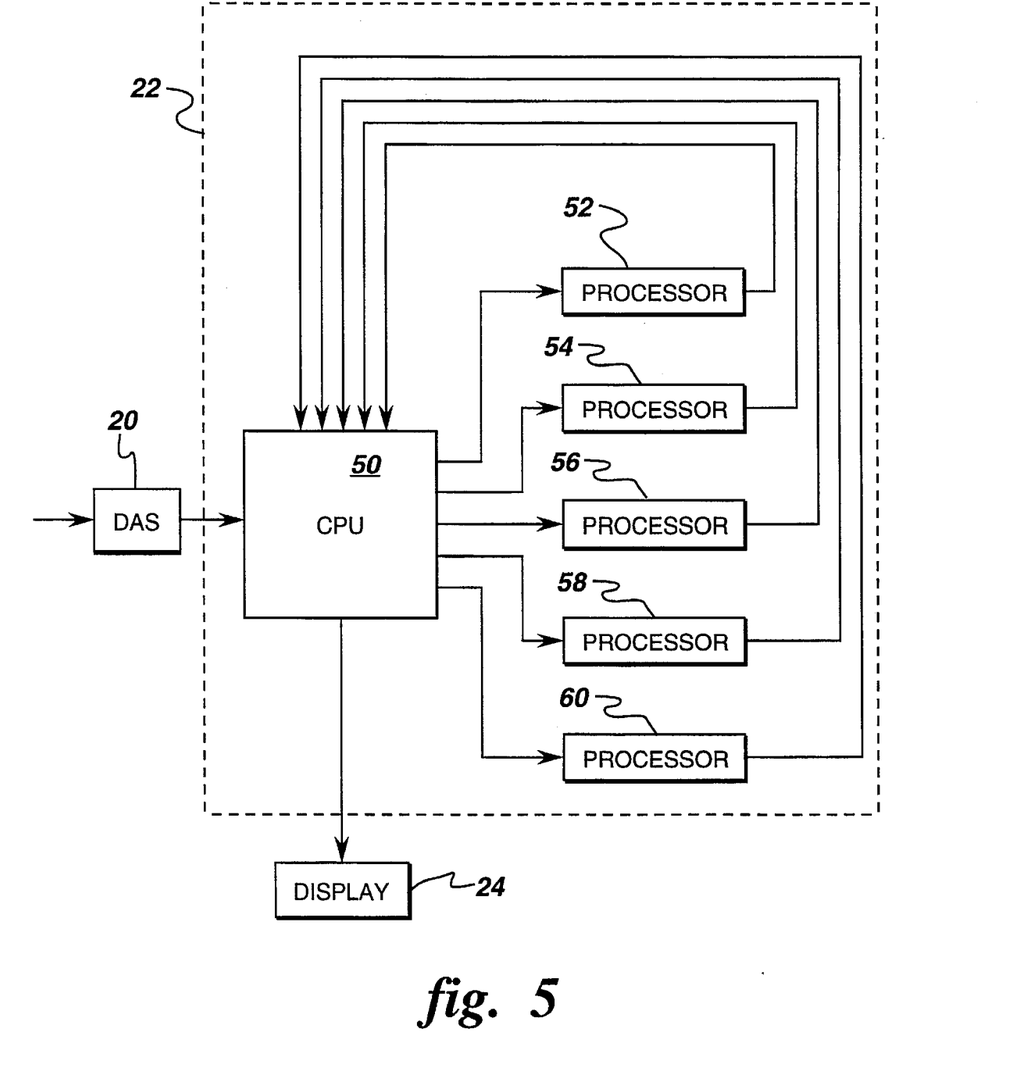
FIG. 5 is a schematic drawing showing a processor array for the system of FIG. 1 in greater detail.

Referring to FIG. 5, there is shown processor array 22 comprising a central processing unit 50, controlling the operation of processors 52–60. It is to be understood that the number of processors $N_{pr}$ has been selected for illustration purposes only, and in fact may be a different, and in some cases much greater, number. CPU 50 couples line integral data received from DAS 20 to the respective processors and controls the operation of each processor to compute an assigned portion of the Radon derivatives required to construct an image of object 10.

As stated above, in the prior art each processor would be tasked to compute all of the Radon derivatives lying in a group of adjacent azimuthal planes 34. However, adjacent planes would all have approximately the same orientation with respect to the source position S along the line T. Accordingly, a processor having its assigned planes oriented toward the center of the line T would have many more Radon derivative computations to perform than another processor, which was assigned adjacent lines oriented such that source position S was toward an end of the line T.

Referring once more to FIG. 3, the grid points $r_n$ define a circle of such radius as stated above. In like manner, each of the grid points $r_1$–$r_{n-1}$ respectively define circles of such radii, $r_1$–$r_{n-1}$. Moreover, the grid points of radius $r_n$ for all of the azimuthal planes 34 collectively define a sphere $S_n$ of radius $r_n$. In like manner, all of the grid points of radii $r_1$–$r_{n-1}$ respectively define spheres, or spherical shells $S_1$–$S_{n-1}$, of such respective radii. Thus, it will be seen that all of the grid points 38 of the azimuthal planes 34 collectively define a set of n spherical shells or bin shells, $S_1$–$S_n$, centered at the Radon space origin O. All non-zero Radon data points thus lie on one of the spherical shells.

Figure 6:
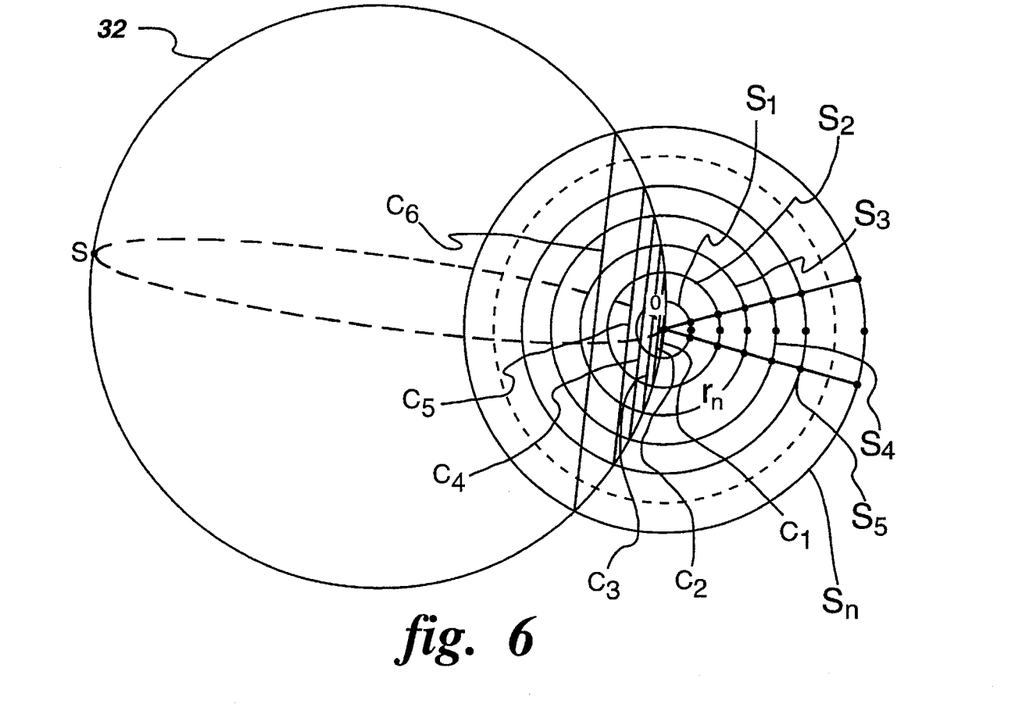
FIG. 6 depicts the intersection of the Radon shell and a set of concentric spherical shells which respectively partition the Radon space.

Referring to FIG. 6, there are shown spherical shells $S_1$–$S_5$ and $S_n$, part of the set $S_1$–$S_n$ defined above, for a given view angle. All of the shells $S_1$–$S_n$ are respectively intersected by the spherical Radon shell 32. As is well known, the intersection of two spherical shells is a circle. Thus, the intersection between Radon shell 32 and each of the bin shells $S_1$–$S_n$ respectively defines circles $C_1$–$C_n$, portions of circles $C_1$–$C_5$ and $C_n$ being shown in FIG. 6. Accordingly, all data points at which Radon derivatives must be computed lie on one or another of the circles $C_1$–$C_n$.

Figure 7:
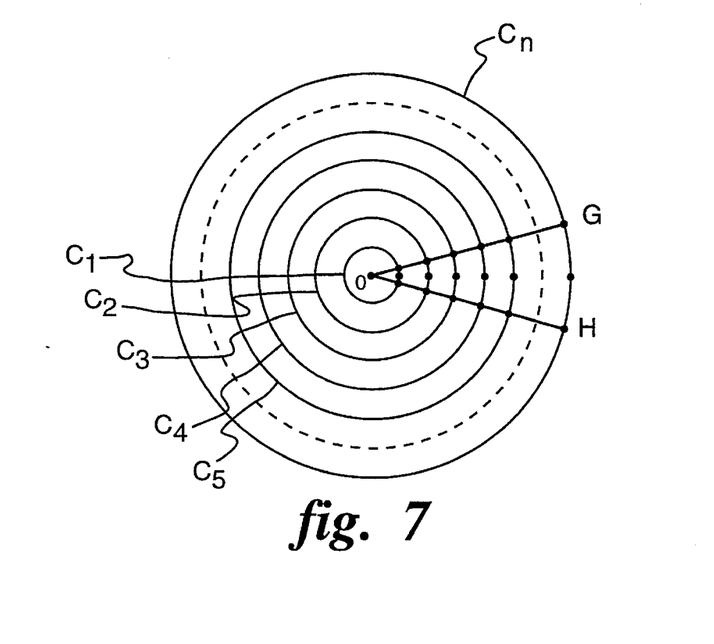
FIG. 7 depicts a set of concentric circles defined by the intersection of FIG. 6 projected into a common plane.

Referring to FIG. 7, there is shown each of the circles $C_1$–$C_5$ and $C_n$ projected onto a common plane which is orthogonal to an axis extending between source S and origin O. The radius of each of the circles is approximately proportional to the radius of the bin shell on which it resides. On the other hand, the density of Polar grid points 38 on a circle $C_i$ (i.e., any one of the Circles $C_1$–$C_n$, lying on any one of the spherical shells) is inversely proportional to the circle radius, and therefore to the radius of the corresponding bin shell. These two effects cancel each other out. Thus, the number of Polar grid points lying on respective intersecting circles $C_i$ are approximately equal to one another. This is illustrated in FIG. 7, wherein the angle GOH is shown to include the same number of grid points for each of the circles $C_1$–$C_5$ and $C_n$.

To compute respective derivatives in accordance with the invention, Radon space is partitioned to provide n spherical bin shells $S_i$, as described above, wherein the total number of bin shells n, divided by the number of processors $N_{pr}$ is equal to an integer m. The CPU 50 is operable to assign m different spheres $S_i$ to each of the processors. From geometric considerations, the coordinates of each grid point for each of the intersecting circles $C_i$ will be known for a given view angle. The CPU 50 is further operable to supply each processor with such coordinates for the intersecting circles lying on its assigned spheres. The processors are then operated in parallel to compute the Radon derivatives at their respective coordinate positions. Thus, each of the processors will have approximately the same derivative computational work load for the given view angle.

Obviously, many other modifications and variations of the present invention are possible in light of the above teachings. It is therefore to be understood that within the scope of the disclosed inventive concept, the invention may be practiced otherwise than as specifically described.

What is claimed is:

1. A method for computing the Radon derivative for respective data points in a set of Radon data points in Radon space from a set of line integral data, said method comprising the steps of:

partitioning said Radon space by a set of concentric spherical shells centered at the origin of said Radon space, so that each of said Radon data points lies on one of said spherical shells;

identifying all the Radon data points lying on said spherical shells for which Radon derivatives must respectively be computed for a given view angle;

assigning a given one of said spherical shells to a given processor in an array of processors; and operating said given processor to compute the Radon derivative for each of said identified Radon data points which lie on said given shell from data contained in said line integral data set.

2. The method of claim 1 wherein said method includes the steps of:

assigning a number of said spherical shells to each processor in said array; and operating each of said processors to compute the Radon derivative for each of said identified Radon data points lying on its respective assigned shells from data contained in said line integral data set.

3. The method of claim 2 wherein said identifying step comprises:

determining the co-ordinates of each of said Radon data points which lies at a point of intersection between one of said spherical shells and the Radon shell for said given view angle.

4. The method of claim 3 wherein:

said assigning step comprises assigning an equal number of said spherical shells to each of said processors; and said processors are operated in parallel to compute said Radon derivatives.

5. In an arrangement for computed tomography imaging of an object, wherein an x-ray cone-beam source irradiates an object at successive view angles to project an image of the object onto an associated detector plane to provide a set of line integral data, a method for computing the Radon derivatives for respective data points in a set of Radon data points for a given view angle, said method comprising the steps of:

defining a set of concentric spherical shells with respect to an origin in Radon space, so that each of said Radon data points having a non-zero value lies on one of said spherical shells;

identifying each of said non-zero Radon data points which also lies on the Radon shell for said given view angle;

assigning all of said identified non-zero Radon data points lying on a given one of said spherical shells to a given processor in an array of processors; and operating said given processor to compute the Radon derivative for each of said assigned Radon data points from data contained in said line integral data set.

6. The method of claim 5 wherein:

each of said processors is assigned the identified Radon data points from a different one of said spherical shells; and said processors are operated to compute the respective Radon derivatives for their assigned Radon data points from data contained in said line integral data set.

7. The method of claim 6 wherein said assigning step comprises:

assigning the identified Radon data points lying on a plurality of said spherical shells to each of said processors.

8. The method of claim 7 wherein:

each of said processors is assigned the identified Radon data points lying on the same number of spherical shells; and said operating step comprises operating said processors in parallel to compute said Radon derivatives.

9. In a system for forming a computed tomography image of an object from a set of Radon data points in Radon space, wherein said space is partitioned into a set of concentric spherical shells so that each of said Radon data points lies on one of said shells, apparatus for computing the Radon derivative for respective Radon data points comprising:

means for generating a set of line integral data;

an array of processors; and means for identifying each Radon data point intersecting the Radon shell for a given view angle, for assigning all the identified Radon data points lying on a given one of said shells to a given processor in said array, and for operating said given processor to compute the Radon derivative for each of said assigned Radon data points from data in said line integral data set.

10. The apparatus of claim 9 wherein:

said apparatus includes means for operating each of said processors to compute the Radon derivative for each Radon data point lying on a number of corresponding spherical shells, the number of shells being the same for each processor.

* * * * *